Dec. 9, 1941.    R. M. OSTERMANN    2,265,854
ELECTRIC DRIVE FOR RAILROAD VEHICLES
Filed May 22, 1939    4 Sheets-Sheet 1

INVENTOR.
Rudolf M. Ostermann
BY Parker + Carter
ATTORNEYS.

Dec. 9, 1941.　　　　R. M. OSTERMANN　　　　2,265,854
ELECTRIC DRIVE FOR RAILROAD VEHICLES
Filed May 22, 1939　　　　4 Sheets-Sheet 2
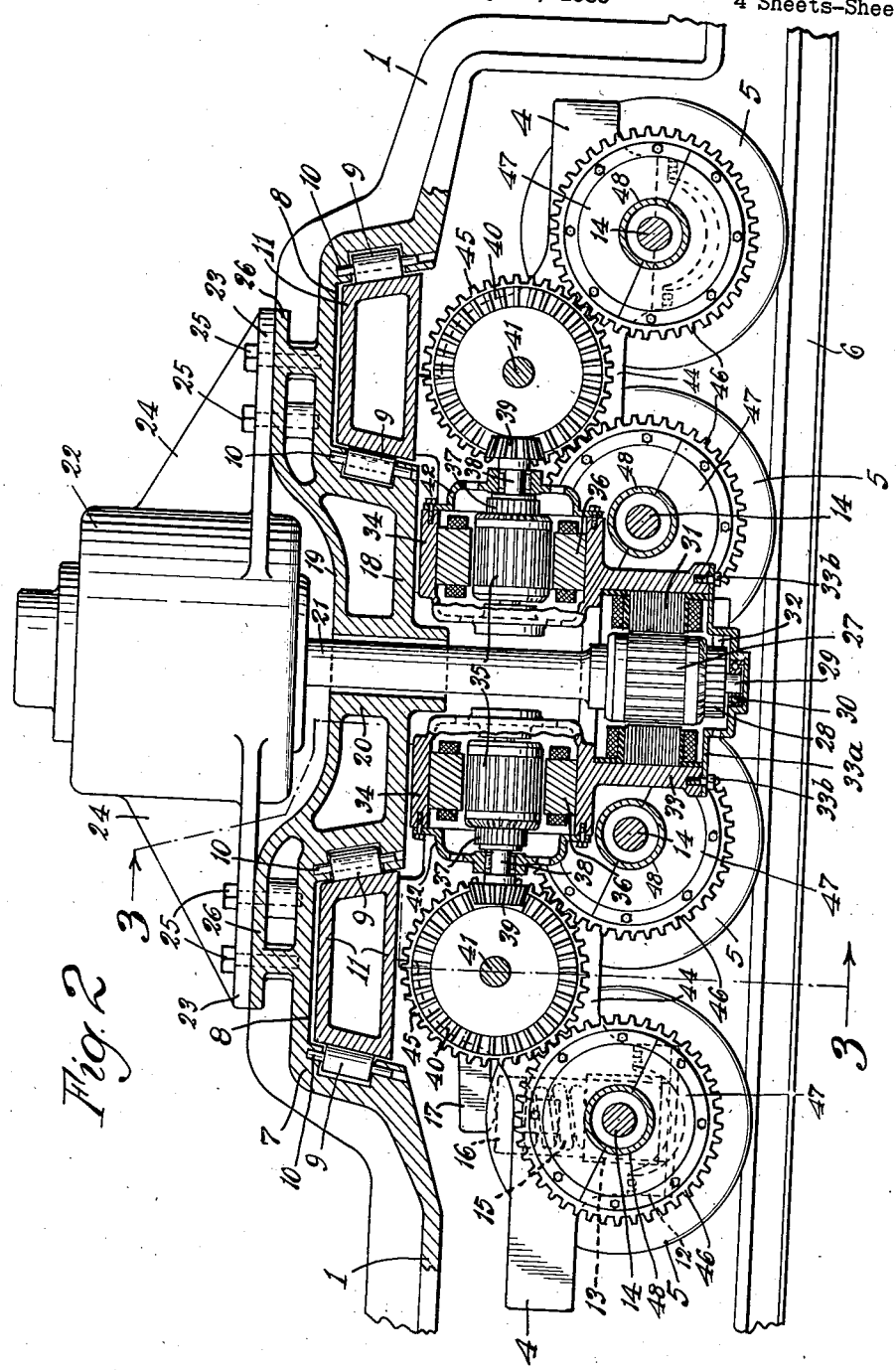
INVENTOR.
Rudolf M. Ostermann
BY Parker + Carter
ATTORNEYS.

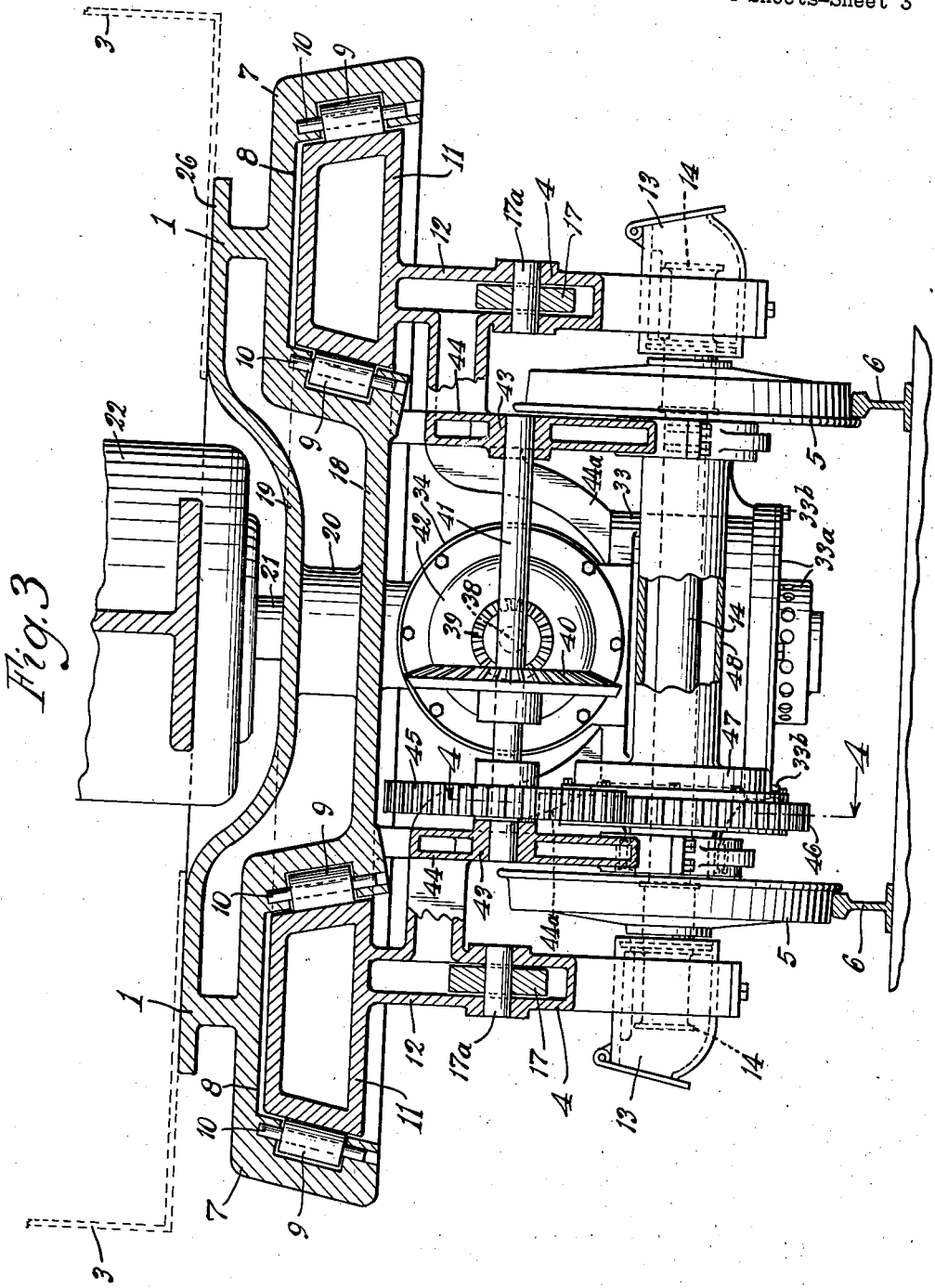

Dec. 9, 1941.  R. M. OSTERMANN  2,265,854
ELECTRIC DRIVE FOR RAILROAD VEHICLES
Filed May 22, 1939   4 Sheets-Sheet 4
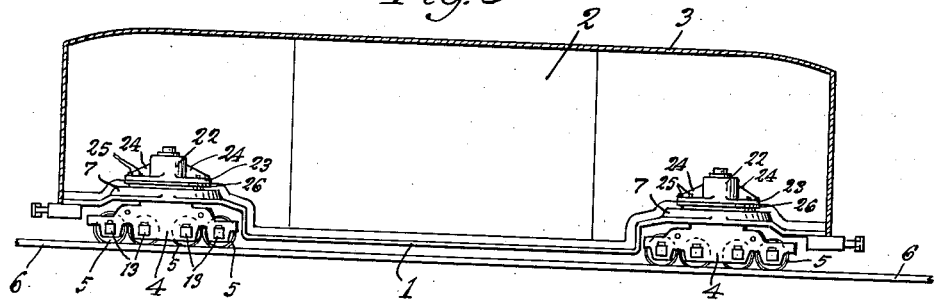
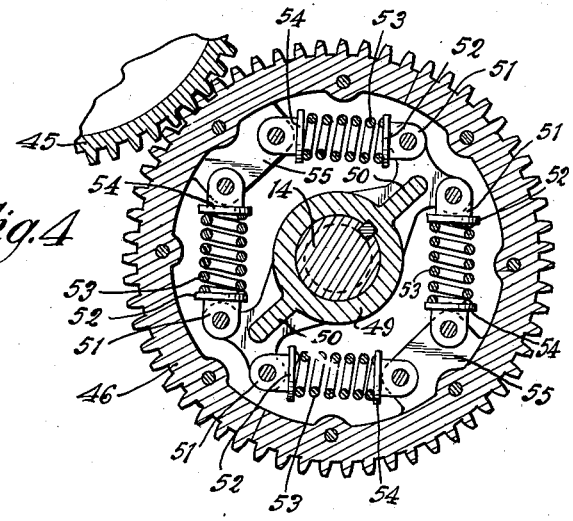
INVENTOR.
Rudolf M. Ostermann
BY
Parker + Carter
ATTORNEYS.

Patented Dec. 9, 1941

2,265,854

UNITED STATES PATENT OFFICE 2,265,854

ELECTRIC DRIVE FOR RAILROAD VEHICLES

Rudolf M. Ostermann, Kenilworth, Ill.

Application May 22, 1939, Serial No. 275,027

13 Claims. (Cl. 105—36)

This invention relates to a vehicle drive and, primarily, to an electrical drive for vehicles. It has one important application in connection with rail vehicles such as locomotives and rail cars. One object of the invention is to provide an electrical drive for use in vehicles which include a main body or vehicle and one or more swiveled trucks and in which the electrical drive is preferably centered about the swiveling axis.

Another object is to provide a combined electrical generating and driving unit. A further object is to provide an electrical drive combining a turbine and a generator concentric with the swiveling axis and including, also, driving motors mounted in direct association with said generator.

Another object is to provide in an electric drive of the type indicated a minimum of unsprung weight. Still further objects are to provide in a locomotive or rail car an electrically driven swivel truck with a low center of gravity and with the elimination of gyroscopic effects in the drive.

Other objects will appear from time to time throughout the specification and the claims.

The invention is illustrated more or less diagrammatically in the accompanying drawings, wherein:

Figure 2 is a vertical, longitudinal section of one form of the invention with some parts in elevation taken at line 2—2 of Figure 1;

Figure 3 is a transverse, vertical section taken at line 3—3 of Figure 2;

Figure 4 is a longitudinal, vertical, sectional detail of one portion of the drive taken at line 4—4 of Figure 3; and Figure 5 is a sectional view with parts in elevation showing one possible application of the drive of the invention.

Like parts are designated by like characters throughout the specification and the drawings.

Figure 1:
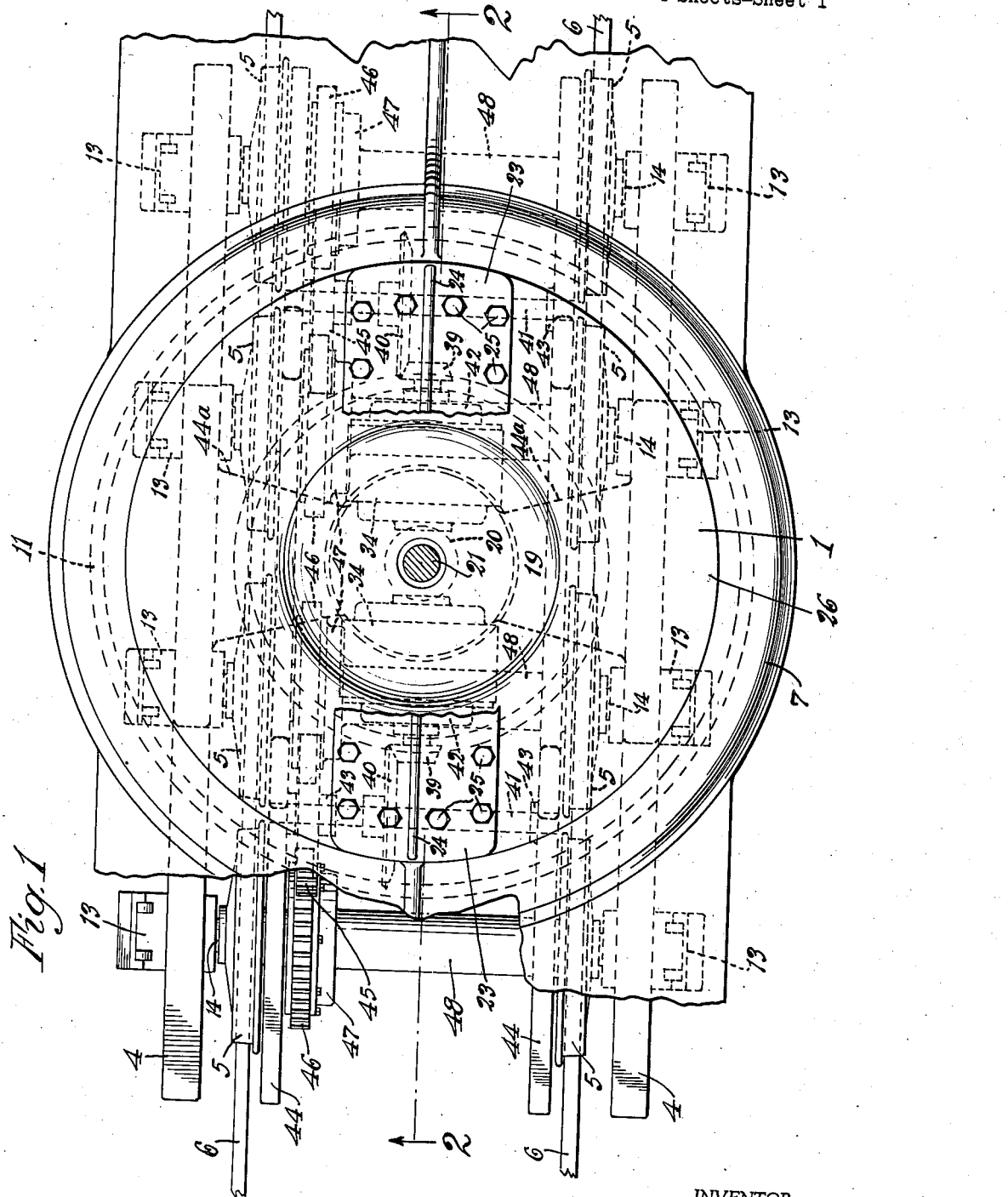
Figure 1 is a plan view with parts omitted and parts in section.

Although the invention might be applied to a variety of vehicles—both road and rail vehicles—it is, as shown herewith, applied to a rail car or locomotive in which a car frame 1 is provided. Any suitable power generating means may be mounted in the space 2 and a body or enclosure 3 may be provided. One or more trucks 4 supports the frame 1 and the parts carried by the frame and the trucks have suitably journaled in them wheels 5 which in the case of a rail vehicle are flanged to run upon rails 6. As shown, particularly in Figures 2 and 3, the frame 1 is provided with an annular enlargement 7 which is shaped on its under side to provide a flared, annular groove or race 8. Anti-friction bearings 9 may be mounted on pins 10 within the groove 8.

The truck 4 includes an annular turn table member 11 which fits within the annular groove 8 and contacts its inclined walls or the anti-friction bearings 9 in case the latter are provided. While both the groove 8 and the turn table 11 are shown as annular, they might be made segmental and parts of the annulus might be omitted. For the purposes of the invention, these members need only be sufficiently large to permit the necessary relative swiveling of the truck and main frame 1 and they need only be of sufficient size to transmit the thrust and other loads which will occur upon the parts during operation.

Depending downwardly from the member 11 and, if desired, made integrally therewith are the side members 12 of the truck 4. The side portions 12 are suitably formed to receive journal boxes 13 within which the ends of axles 14 are received in suitable bearings. Springs 15 contact at one end the journal boxes 13 and at the other plates 16 which may bear directly upon some fixed portion of the truck frame or may bear upon equalizer levers 17 which, as shown, are pivoted upon pins 17a in the side members 12 of the truck frame 4. The particular details of the axles, bearings, suspension springs and equalizers form no essential part of the invention and will not be illustrated further.

The frame 1 within the annular or turn table groove 8 is provided with portions 18, 19 which support a generally tubular or cylindrical section 20. Through this tubular section passes a shaft 21 of a turbine which is enclosed in a housing 22. The housing may have integral web portions 23, 24 by means of which it is secured by bolts or screws 25 to suitable receiving portions 26 of the main frame 1.

The details of the turbine are not shown as they form no essential part of the present invention and although a steam turbine is for some purposes preferable, other turbines and driving means might be used and it is sufficient for the purposes of the present invention that power means be provided in the housing 22 for rotating the shaft 21 with suitable force and at suitable speeds.

Positioned upon the shaft 21 is a generator armature or rotor 27 which may have a commutator 28 and is reduced as at 29 and received in a bearing 30. A generator field coil or stator 31 is positioned about the armature 27 and one or more brushes 32 contact the commutator 28. A housing member 33 is positioned about the shaft 21 and encloses and supports the field coil 31. A cover or closure 33a is removably secured to the housing 33 by screws 33b or otherwise and supports the bearing 30 and the brush or brushes 32.

Preferably integral with the housing portion 33 are additional housing portions 34, 34 within which are located two driving motors. As shown, these motors comprise armatures 35, field coils 36, commutators 37 and suitable bearings and brushes. On each of the driving motor shafts 38 is mounted a beveled pinion 39 which meshes with a beveled gear 40 carried on a shaft 41. The housing sections 34 are closed by cover plates 42 which carry suitable bearings for the shafts 38 and, also, enclose and support brushes for the motors.

The shaft 41 is carried in suitable bearings 43 formed in extensions 44 attached to or made integral with the turn table 11. Secured, also, on each of the shafts 41 is a spur gear 45. Each of these spur gears meshes with two corresponding spur gears 46, 46 which are secured to and mounted upon the outside of an enlargement 47 of a quill 48.

Each of the axles 14 has mounted upon it a member 49 from which pairs of ears or lugs 50 project outwardly. Between each pair of ears is pivoted a spring abutment block 51, each block provided with two oppositely positioned, outwardly facing members 52. Upon each of the members 52 is seated one end of a spring 53. Each of the springs 53 has its opposite end seated upon a spring abutment 54 pivoted on a lug 55 formed in a spur gear 46 or in a member suitably attached to it. The construction just described provides a flexible link between the spur gear 46 and the axle 14 about which it is positioned so that rotation of the spur gear is transmitted through the springs 53 to the axle 14 and relative movement between each axle 14 and its gear 46 is made possible by this construction.

Although I have shown an operative form of my device, it will be understood that many changes in the form, shape and arrangement of parts might be made without departing from the spirit of my invention; and I wish that my showing be taken as in a sense diagrammatic. In particular, although the generator armature which rotates around the swiveling axis of the truck is shown as being driven by a steam turbine, it might be otherwise driven. The rotor of the steam turbine might be of any type and any desirable type of driving engine may be used and it may be placed at any suitable location in the total assembly. For some purposes, it will be desirable to substitute other means for driving the vertical shaft which carries the generator armature. This shaft might be geared or otherwise connected to a shaft of a horizontally positioned engine, whether a turbine or not, and this engine might be positioned anywhere on the main frame.

Although it is preferable to embody the invention in an assembly in which two trucks at least are used and in which a "well" construction is embodied in the main frame to lower the center of gravity of the total assembly, this construction might be altered without departing from the spirit of my invention. Although the generator and motors shown are indicated as being of more or less conventional types, the invention is not limited to their use. In fact, for some purposes it is preferable to use a so-called monopolar or homo-polar generator and motor. Such motors, although of limited commercial use at present, are particularly advantageous where ample current at low voltages is desirable and in the present case where high speed steam turbines may be used and where the current which is generated is to to used almost at the point at which it is generated, homo-polar generators and motors have especial advantages, and it is within the contemplation of my invention, therefore, to use generators and motors of that type as well as generators and motors of the type indicated in Figure 2.

The use and operation of this invention are as follows:

In general, where the present invention is to be used, it is embodied in a vehicle having a main body and to which one or more wheeled trucks are swiveled. Means are provided for driving preferably all of the wheels so that each wheel is both a carrier and a driver. Although swiveling trucks on vehicles of relatively small sizes and powers have been used, power driven swivel trucks have not been used where high speeds and large powers are required because heretofore "nose" suspended electrical motors with flexible cable connections have been the only means available for use on electrically operated swivel trucks and these, because of their great weight, have proven impractical for large motor units, particularly, also, because of the large unsprung weights involved. Thus, on previous electric locomotives of very high horse power, the motors have been mounted on the main frame and a large number of smaller motors has been employed. All these complications are avoided by the present invention.

With the parts assembled as shown, where a steam turbine is used, steam is supplied from a suitable source on the body and the turbine is caused to rotate. This rotation is transmitted through the shaft 21 to the armature 27 and current is generated and the current is conducted to the motors and the motor armatures 35 are caused to rotate. Their rotation is transmitted to the shafts 41 and through the gears carried by the shafts and through the quills is transmitted to the axles 14 and, thus, rotation of the turbine drives the wheels.

The electrical wiring and control means have been omitted. Obviously, means must be provided to transmit the current generated to the motors and means must be provided for controlling the motor operation and for controlling the operation of the generator and the turbine. The invention, however, is not limited to any particular control or electric current transmission means and in order to simplify the showing these parts have been omitted.

When the device as shown moves along a railroad track or along a road, in case it be a road vehicle, from time to time turning occurs. When that happens, the trucks swivel with respect to the main body and this swiveling movement is permitted by the turntable construction shown. The turntable serves, also, as an abutment for the transmission of power and is of such size and strength that the necessary loads are safely transmitted.

The arrangement of two swiveling trucks produces a perfectly articulated locomotive and this truck arrangement, in particular, is ideal for high speeds. The "well" construction shown produces a low center of gravity for the entire locomotive. Construction of the present invention also eliminates or counteracts generally gyroscopic effects which might otherwise be undesirable. By using a drive from above such as the turbine or its equivalent, the "well" construction may be adapted and, thus, the center of gravity of the locomotive as a whole may be lowered. These and many other advantages follow from the construction here illustrated and described.

The construction of the present invention is particularly applicable to use in a locomotive equipped with propelling machinery weighing less per horse power than that at present customary in locomotive practice and is readily adapted and is ideally adapted to transmit high power in high speed service.

Since the power is transmitted through a shaft positioned at the swiveling center of each truck, the propelling torque of the shaft tends to turn the truck as a whole until the latter clamps itself, so to speak, between the rails. Thereby, the adhesion of the wheels to the rails is increased and slipping of the drivers is made unlikely and, in particular, zig-zag or wobbling movement of the truck and locomotive when running on a track is effectively prevented. Under certain surface conditions, it may be desirable to limit this clamping effect and to do that a torque restraining device is applied to the turntable which joins the truck and body frames. Such a torque restrainer will keep the lateral pressure between the wheel flanges and the rail within the proper limits for suitable service.

By the construction shown, the weight of electric machinery is reduced, primarily because of the reduction in the number of motors. The arrangement of the generator and motor armatures is, also, such that gyroscopic effects upon the track and upon the loading of the axles are completely eliminated and, for this reason, motors and generators of the highest speeds may be used. The turntable between the main frame and the truck frames forms during its turning a bearing for the main frame without the interposition of springs and furnishes also an abutment through which the propelling power of the truck is fully imparted to the main frame and draw bar in any relative position of the truck and main frame and unsprung weights are reduced to a minimum.

I claim:

1. In combination in a locomotive, a main locomotive body, a truck swiveled to said body, an engine positioned on said body, a generator formed of a plurality of parts, said engine connected to said generator to drive the same, one part of said generator being supported from said body for rotation and another being supported from said truck, the part of the generator which is supported from said body being concentric with the swivel of said truck.

2. In combination in a locomotive, a main locomotive body assembly, a plurality of trucks, each swiveled to said assembly, a source of power on said main locomotive body, a plurality of prime movers positioned on said body, rotary elements driven by said prime movers, each mounted co-axially with the swivel connection of one of said trucks, an electric generator member carried by each of said rotary elements, a plurality of electric motors on said truck, wheels on said truck and driving connections from said motors to said wheels, a cooperating electric generator member carried by each of said trucks and arranged to cooperate with its respective rotary generator member.

3. In combination in a locomotive, a main locomotive body assembly, a plurality of trucks, each swiveled to said assembly, a plurality of prime movers positioned on said body, rotary elements driven by said prime movers and each mounted co-axially with the swivel connection of one of said trucks, electric generator members carried by each of said rotary elements, and cooperating electric generator members carried, one on each of said trucks, an electric motor on each truck, wheels on said truck and driving connections from said motors to said wheels and pairs of arcuate abutment assemblies, each positioned partly on said locomotive frame and partly on a truck.

4. In combination in a locomotive, a main locomotive body assembly, a plurality of trucks, each swiveled to said assembly, a source of power on said main locomotive body, a plurality of prime movers positioned on said body, rotary elements driven by said prime movers each mounted co-axially with the swivel connection of one of said trucks, electric generator members carried by each of said rotary elements and cooperating electric generator members carried, one on each of said trucks, an electric motor on each truck, wheels on said truck and driving connections from said motors to said wheels and pairs of arcuate abutment assemblies each positioned partly on said locomotive frame and partly on a truck, said abutments being concentric with the swivel joint.

5. In combination, a locomotive and a truck, and a vertically aligned swivel connection between said locomotive and said truck, a high-speed turbine positioned upon said locomotive and a source of steam for said turbine positioned upon said locomotive and a vertical shaft extending from said turbine to said truck and lying concentric with the vertical axis of said swivel joint, an electric generator armature upon said shaft, a generator field member supported on said truck and positioned about and concentric to said armature, and a motor mounted in said truck, said truck having a plurality of wheels, driving connections from said motor to said wheels and arcuate centering and thrust-receiving abutment assemblies, each located in part on said truck and in part on said locomotive.

6. A rail vehicle having a longitudinal main frame, and, swiveled to an end portion of the main frame, a power driven supporting truck, which supports a portion of said main frame, the two being mounted to swivel with respect to each other, a turbine vertically mounted on said main frame, an electrical generator part directly connected to said turbine and mounted adjacent said truck and driven by said turbine, the turbine and generator being coaxial with the swivel of said truck, and a cooperating generator part, mounted on said truck and about and concentric with said first mentioned generator part.

7. In combination in a locomotive, a main locomotive body assembly, a truck swiveled to said assembly, a source of power on said main locomotive body, a prime mover positioned on said body, a rotary element driven by said prime mover and mounted co-axially with the swivel connection of said truck, an electric generator member carried by said rotary element, an electric motor on said truck, wheels on said truck and driving connections from said motor to said wheels and a unitary field structure member, the field of said generator member and of said motor being positioned within said field structure member.

8. In combination in a locomotive, a main locomotive body, a truck swiveled to said body, wheels on said truck, a source of mechanical power on said body, electric driving motors on said truck, mechanical driving connections from said motors to said wheels, a generator comprising an armature, said armature being supported from said main frame, and a field coil supported from said truck, said coil being positioned about and concentric with said armature, there being an air gap between the two, and a shaft connecting said source of mechanical power to said armature.

9. In combination in a locomotive, a main locomotive body, a truck swiveled to said body, a prime mover positioned on said body, a rotary element driven by said prime mover and mounted coaxially with the swivel connection of said truck, an electric generator formed of a plurality of parts, one of said parts being carried by said rotary element, and another of said parts being carried by said truck, an electric motor on said truck, wheels on said truck and driving connections from said motor to said wheels.

10. In combination in a locomotive, a main carrying frame and a truck frame swiveled thereto, without center bearing and arranged to turn about a vertical axis and means holding it against other movement in relation to the main frame, a prime mover mounted on said main frame, a shaft coaxial with said vertical axis and driven from said prime mover, a generator armature member on the shaft, a magnetic field-member on said truck positioned about said armature, the said armature positioned to revolve with the said shaft with a mechanical air gap within and in inductive relation to the said magnetic field member, axles and wheels on said truck frame, electric motors for driving said axles, the said motors being operatively connected to said generator armature member.

11. In combination in a locomotive, a main locomotive body, a truck swiveled to said body, a source of power on said body, wheels on said truck, means for driving said wheels from said source of power, including a motor, a motor shaft, and wheel driving members on said truck, and means for energizing said motor, said means comprising an electric generator driven from said source of power, said generator being positioned below said locomotive body with the axis of rotation thereof concentric with the axis of swivel connection between said truck and said body.

12. In combination in a locomotive, a main locomotive body, a truck swiveled to said body, a source of mechanical power on said body, a shaft driven by said source of power and disposed concentric with the swivel axis of said truck, wheels on said truck, means for driving said wheels from said source of power, said driving means including a generator driven by said shaft, and having a rotor on said shaft, wheel driving motors on said truck, said rotor being out of physical contact with said truck and being supported from said locomotive body, said motors being energized from said generator, said generator including a stator mounted on said truck and positioned about and concentric with said rotor and out of physical contact therewith.

13. In combination in a locomotive, a main locomotive body, a wheeled truck swiveled to said body, a source of mechanical power on said body, a shaft driven by said source of power and concentric with the swivel axis of said truck, an electric generator armature on said shaft, wheel driving motors on said truck, said wheel driving motors being supplied with electric current by said generator, a generator field on said truck, said generator field cooperating with said generator armature and swiveling relative thereto in concentric alignment with said generator armature and drive shaft.

RUDOLF M. OSTERMANN.